US012627985B2

(12) United States Patent
Doyle et al.

(10) Patent No.: US 12,627,985 B2
(45) Date of Patent: May 12, 2026

(54) SECURE ZERO TOUCH PROVISIONING OF NETWORK DEVICES USING BLUETOOTH APPLICATION

(71) Applicant: Arista Networks, Inc., Santa Clara, CA (US)

(72) Inventors: Eamon Doyle, Dublin (IE); Saurabh Singhal, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 79 days.

(21) Appl. No.: 18/491,643

(22) Filed: Oct. 20, 2023

(65) Prior Publication Data

US 2025/0133404 A1 Apr. 24, 2025

(51) Int. Cl.
*H04W 12/04* (2021.01)
*H04W 12/30* (2021.01)
*H04W 12/60* (2021.01)

(52) U.S. Cl.
CPC ........... *H04W 12/35* (2021.01); *H04W 12/04* (2013.01); *H04W 12/66* (2021.01)

(58) Field of Classification Search
CPC ...... H04W 12/04; H04W 12/35; H04W 12/66
See application file for complete search history.

(56) References Cited

U.S. PATENT DOCUMENTS 10,791,118 B2 * 9/2020 Konda ................ H04L 63/0876
2005/0226144 A1 * 10/2005 Okita ................... H04L 45/586
370/251

2011/0119400 A1 * 5/2011 Manion .................. H04L 45/54
709/242
2020/0204538 A1 * 6/2020 Friel .................. H04L 63/0876
2021/0120088 A1 * 4/2021 Barton ............... H04L 41/0886
2023/0325848 A1 * 10/2023 Mudivarthy ....... G06Q 30/0185
709/222

OTHER PUBLICATIONS

Internet Engineering Task Force, RFC 8572 by Watsen et al., Apr. 2019. (Year: 2019).*

(Continued)

*Primary Examiner* — William S Powers
(74) *Attorney, Agent, or Firm* — Sprinkle IP Law Group

(57) ABSTRACT

A method for provisioning a network device can include, on a network device in a factory-default state and having a factory-installed Secure Zero Touch Provisioning (SZTP) agent, enabling a wireless communication capability of the network device. Upon detecting the wireless communication capability being enabled, the SZTP agent attempts to establish a connection with an SZTP application on a computing device in close proximity to the network device. Once connected, the SZTP agent requests SZTP bootstrap information from the SZTP Application, receives SZTP artifacts, and determines whether the SZTP artifacts contain redirect information to an SZTP bootstrap server. If so, the SZTP agent validates the redirect information and attempts to connect to the SZTP bootstrap server. Once connected, the SZTP agent attempts to retrieve network device provisioning artifacts from the SZTP bootstrap server and provisions the network device using the network device provisioning artifacts retrieved from the SZTP bootstrap server.

20 Claims, 4 Drawing Sheets

(56) References Cited

OTHER PUBLICATIONS

Watsen, K., Farrer, I., Abrahamsson, M., Secure Zero Touch Provisioning (SZTP), Internet Engineering Task Force, ISSN: 2070-1721, at <<https://www.rfc-editor.org/info/rfc8572>> Apr. 2019, 87 pgs.

Secure Network Device Provisioning with Removable Storage Device, U.S. Appl. No. 18/485,959, filed Oct. 12, 2023, 35 pgs.

* cited by examiner

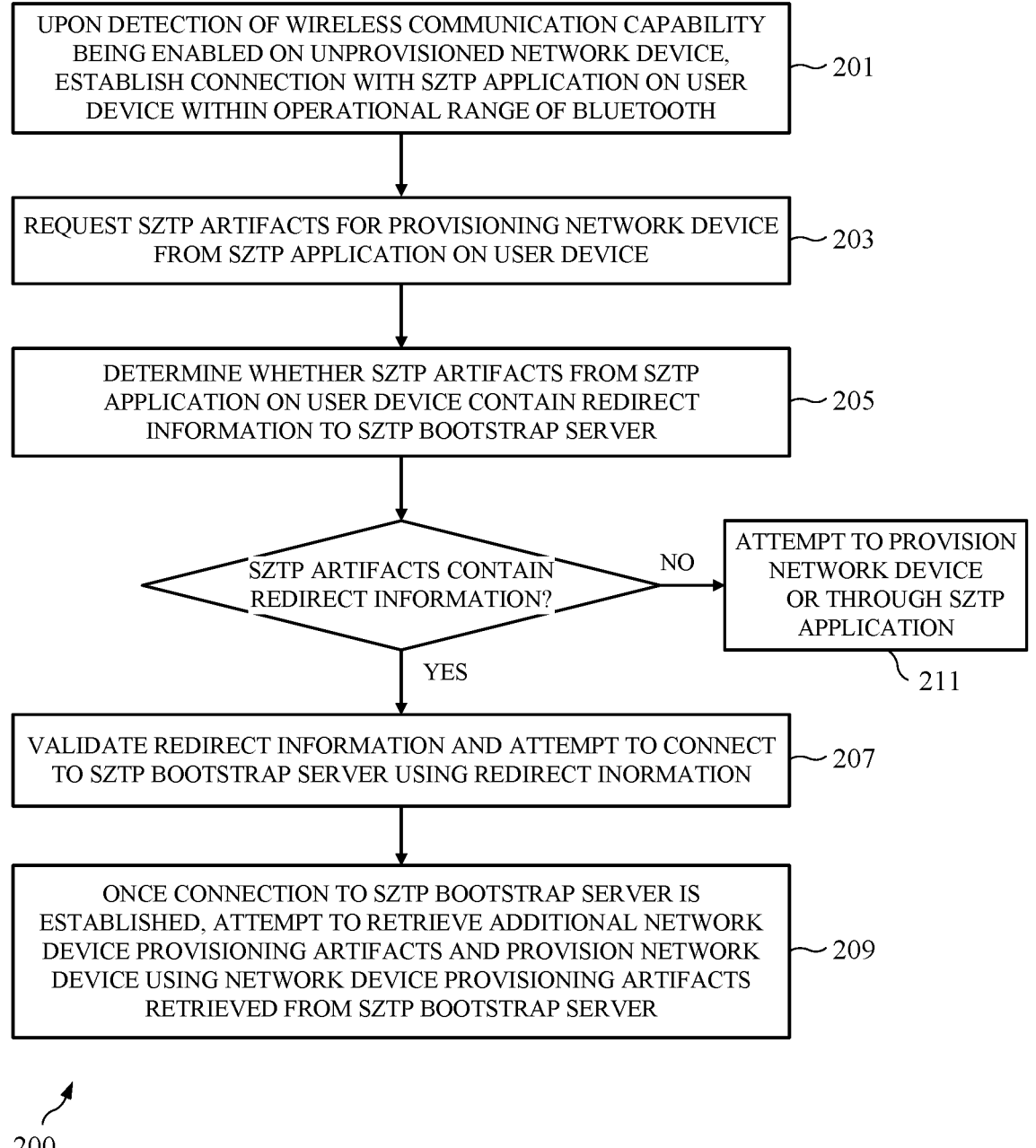

UPON DETECTION OF WIRELESS COMMUNICATION CAPABILITY
BEING ENABLED ON UNPROVISIONED NETWORK DEVICE,
ESTABLISH CONNECTION WITH SZTP APPLICATION ON USER
DEVICE WITHIN OPERATIONAL RANGE OF BLUETOOTH — 201

REQUEST SZTP ARTIFACTS FOR PROVISIONING NETWORK DEVICE
FROM SZTP APPLICATION ON USER DEVICE — 203

DETERMINE WHETHER SZTP ARTIFACTS FROM SZTP
APPLICATION ON USER DEVICE CONTAIN REDIRECT
INFORMATION TO SZTP BOOTSTRAP SERVER — 205

SZTP ARTIFACTS CONTAIN
REDIRECT INFORMATION?

NO → ATTEMPT TO PROVISION
NETWORK DEVICE
OR THROUGH SZTP
APPLICATION — 211

YES

VALIDATE REDIRECT INFORMATION AND ATTEMPT TO CONNECT
TO SZTP BOOTSTRAP SERVER USING REDIRECT INORMATION — 207

ONCE CONNECTION TO SZTP BOOTSTRAP SERVER IS
ESTABLISHED, ATTEMPT TO RETRIEVE ADDITIONAL NETWORK
DEVICE PROVISIONING ARTIFACTS AND PROVISION NETWORK
DEVICE USING NETWORK DEVICE PROVISIONING ARTIFACTS
RETRIEVED FROM SZTP BOOTSTRAP SERVER — 209

SECURE ZERO TOUCH PROVISIONING OF NETWORK DEVICES USING BLUETOOTH APPLICATION

TECHNICAL FIELD

This disclosure relates generally to network devices. More particularly, this disclosure relates to an extensible mechanism for bootstrapping network devices over Secure Zero Touch Provisioning (SZTP) using a Bluetooth® SZTP application to redirect to bootstrap servers.

BACKGROUND OF THE RELATED ART

Generally, network devices shipped from manufacturers need to be configured or otherwise set up before they can operate on computer networks and communicate with other networked devices. In this context, the term "network provisioning" or "provisioning" generally refers to the process of configuring or setting up unprovisioned network devices. Provisioning these network devices (e.g., switches, routers, access points, firewalls, gateways, networking appliances, etc.), however, often falls on authorized users (e.g., site managers, technicians, installers, etc.) at remote sites who have no (or limited) networking expertise. In addition to cabling, such a network device must be configured correctly to connect a remote site to a network (e.g., an enterprise network) in a secure manner. However, such a remote site (e.g., a customer-defined location, a branch office, etc.) often lacks specialized equipment (e.g., a capable laptop computer, a serial cable programmed to operate at a specific frequency and/or an Ethernet cable for a secure shell (SSH) connectivity, etc.) and computer programs required to connect the network device to a network management service capable of performing operations, administration, maintenance, and provisioning (OAMP) functionalities.

Even when connected and configured properly, the network device may still not be able to connect to the network if Dynamic Host Configuration Protocol (DHCP) and/or other service discovery features are unavailable. Additionally, a misconfiguration in the network device could result in a security breach. As a result, a provider (e.g., a manufacturer) of the network device must dispatch a more experienced network engineer to troubleshoot the site connectivity and properly configure the network device, which increases deployment costs, inefficiency, and complexity for both the network device owner and the provider.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 2 is a flowchart that illustrates an example of a method for provisioning an unprovisioned network device according to some embodiments disclosed herein.

DETAILED DESCRIPTION

Figure 1:
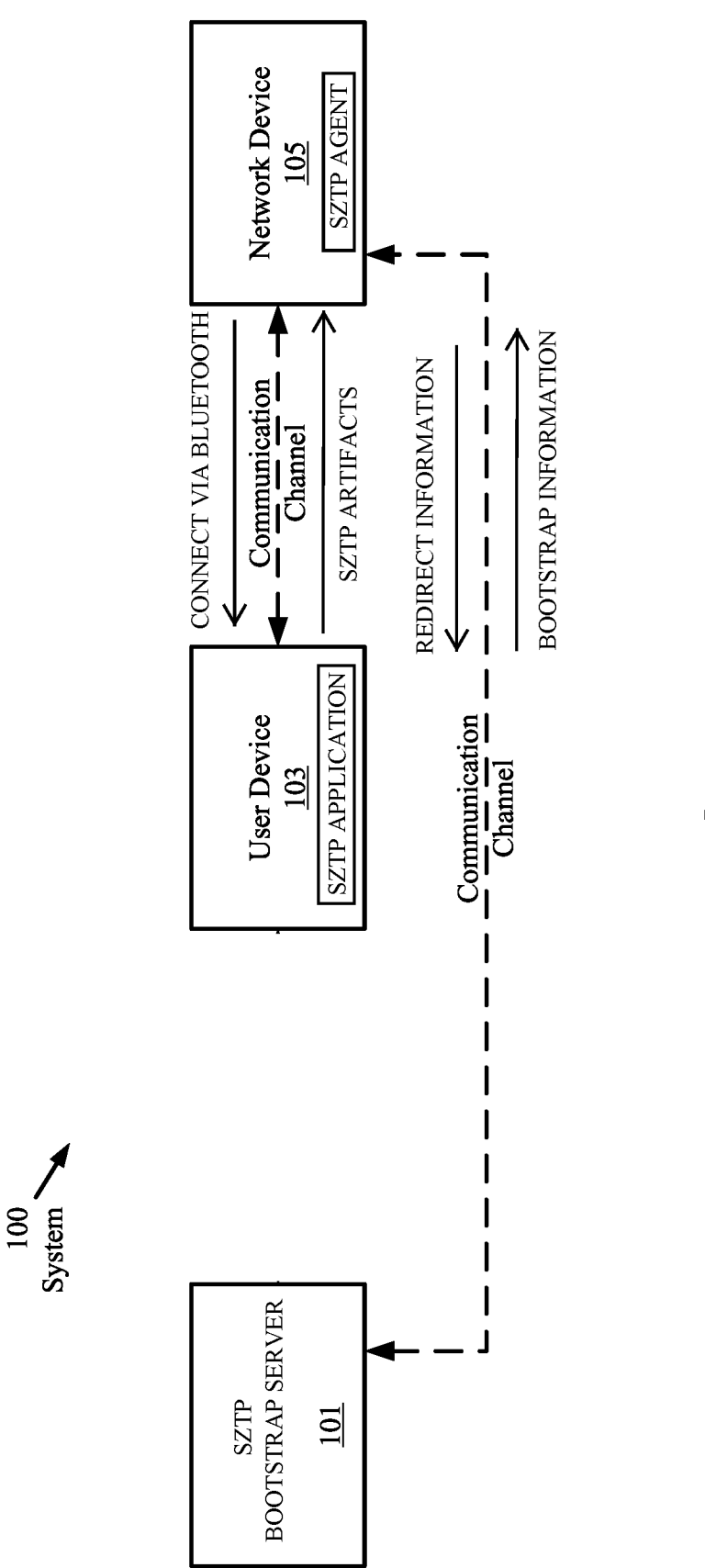
FIG. 1 depicts a diagrammatical representation of a system according to some embodiments disclosed herein.

Specific embodiments will now be described with reference to the accompanying figures (FIGS). The figures and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

Zero Touch Provisioning (ZTP) allows network devices to self-provision without administrator interaction. Upon installation, these network devices would enter the ZTP mode when powering up, without a start-up configuration.

RFC8572 is an Internet Engineering Task Force (IETF) document that describes the specifications of the Secure Zero Touch Provisioning (SZTP) protocol for securely provisioning a networking device when it is booting in a factory-default state. The SZTP protocol supports a number of alternative sources of bootstrapping data, including DHCP, removable storage devices, and bootstrap servers (which can also be referred to as RESTCONF servers or SZTP bootstrap servers and which are collectively referred to hereinafter as "SZTP bootstrap servers").

As those skilled in the art can appreciate, DHCP can automatically provide an Internet Protocol (IP) host with its IP address and other related configuration information such as the subnet mask and default gateway. DHCP is commonly used for configuring an IP address on a device interface. However, DHCP has known limitations. For instance, DHCP is not secure and is inherently limited by the size of the packets and, therefore, must be combined with an SZTP bootstrap server. Thus, in some cases, using a Bluetooth® SZTP application (which is a computer program used by end users and designed to carry out SZTP of an unprovisioned network device through Bluetooth®, a type of short-range wireless technology known to those skilled in the art, other than a task relating to the operation of the computer itself) is preferable. Unfortunately, exclusively using such a Bluetooth® SZTP application to bootstrap network devices may suffer from a few limitations:

Firstly, all SZTP configuration artifacts must be made available prior to provisioning, rather than generated in real time. This is because those SZTP configuration artifacts provide onboarding information (e.g., ownership voucher, owner certificate, etc.) necessary for a network-device to fully self-provision.

Secondly, the network device being provisioned is not aware of a bootstrap server to send SZTP progress reports (e.g., steps in the SZTP provisioning process as defined in RFC8572) informing administrators of the provisioning status of the network device. This prevents centralized administration monitoring of the status of new network devices provisioned over SZTP. While the Bluetooth® SZTP application users can report provisioning status via the Bluetooth® SZTP App, they are not expected to be sufficiently technically proficient to handle troublesome boot-strapping issues when and if these issues occur.

Thirdly, a Bluetooth® SZTP Application is not a suitable mechanism for distributing boot-image versions, as opposed to SZTP bootstrap servers. The Bluetooth® SZTP Application relies on a short-range wireless connection to pair the user device with individual Bluetooth®-enabled devices and thus is not an efficient distribution mechanism.

To address the aforementioned limitations and technical issues of using DHCP or using a Bluetooth® SZTP application exclusively, embodiments of the invention disclosed herein provide a new approach that advantageously combines the use of the Bluetooth® SZTP application with the SZTP bootstrap server to achieve a comprehensive solution that can be used to fully provision network devices in a secure manner and also gather SZTP progress reports in a central location. The Bluetooth® SZTP application provides SZTP redirect information to the network device which then contacts an SZTP bootstrap server to obtain bootstrapping information.

In some embodiments, prior to the first, initial booting of a network device in a factory-default state, Bluetooth® is enabled on the network device (e.g., by any person with a minimum technical training). The network device, which has not yet been provisioned, has a factory-provided SZTP agent. Upon enabling Bluetooth® on the network device, the SZTP agent detects that Bluetooth® has been enabled and attempts to establish a connection to a Bluetooth® SZTP Application, which can run on a laptop computer or a user device (e.g., smart phone, tablet, etc.) near (i.e., in close proximity within the operational range of Bluetooth® communications to) the to-be-provisioned network device.

Once the connection is successfully established, the SZTP agent on the network device then requests SZTP bootstrap information (e.g., using the get-bootstrapping-data remote procedure call per RFC8572) from the Bluetooth® SZTP Application, optionally providing appropriate device information as necessary or desired. In turn, the Bluetooth® SZTP Application responds with SZTP artifacts for provisioning the network device. The SZTP artifacts comprise configuration information for setting up the network device on a computer network.

As a non-limiting example, the configuration information can include at least one of a network address, a routing policy, credential information, or domain name server information. The SZTP artifacts provided by the Bluetooth® SZTP Application can vary from implementation to implementation. In general, SZTP artifacts can be signed and encrypted as per RC8572.

In some embodiments, the SZTP artifacts provided by the Bluetooth® SZTP Application are insufficient to self-provision, but provide redirect information to an SZTP bootstrap server. The redirect information is sufficient to allow the network device to open a connection to the SZTP bootstrap server (via either a secure or insecure connection).

The SZTP bootstrap server will then typically provide a complete set of SZTP artifacts that are sufficient for the SZTP agent on the network device to provision the network device. The complete set of SZTP artifacts from the SZTP bootstrap server are not combined with the artifacts originally received from the user device. If the SZTP artifacts contain redirect information to an SZTP bootstrap server (accessible via an SZTP bootstrap server application programming interface (API)), the SZTP agent validates the redirect information and attempts to connect to the SZTP bootstrap server (establishing either an untrusted or trusted connection).

A trusted connection is established if the redirect information from the Bluetooth® SZTP Application is signed and/or encrypted by the owner and contains a voucher that has been signed by the manufacturer (verified by using the manufacturer's public key included on the network device). An untrusted connection is established if the redirect information from the Bluetooth® SZTP Application is not signed by the owner of the network device. The Bluetooth® SZTP Application may access a central database (e.g., one that is maintained by the manufacturer of the network device) to inquire about owner information. Signing and encrypting SZTP artifacts can follow the same conventions as per RFC8572.

An alternative option is that the SZTP bootstrap server, once a connection is established with the SZTP agent on the network device, provides further redirect information to another SZTP bootstrap server (up to a limit of ten, as per RFC8572). In turn, the network device follows the chain of redirect information until it receives onboarding information or fails, at which point it then restarts the whole process. In this case, the user device does not provide any onboarding information and simply provides the redirect information which, upon successful provision of the network device, will be discarded.

In some embodiments, as per RFC8572, the SZTP agent on a network device may attempt to promote an untrusted connection to the SZTP bootstrap server to a trusted connection. Once a connection is established with the SZTP bootstrap server, the SZTP agent on the network device will attempt to retrieve network device provisioning artifacts from the SZTP bootstrap server and provision the network device using the artifacts retrieved from the SZTP bootstrap server. If a trusted connection has been established, the network device can send SZTP report-progress reports to the SZTP bootstrap server.

By combining the usage of the Bluetooth® SZTP Application with SZTP bootstrap servers, the SZTP agent overcomes the limitations listed above when the SZTP agent works with the Bluetooth® SZTP application exclusively.

FIG. 1 shows a system (100) in accordance with some embodiments disclosed herein. The system (100) includes a SZTP bootstrap server (101), a user device (103), and a network device (105). Each of these components is described below.

In some embodiments, the SZTP bootstrap server (101) may provide bootstrap information for booting a network device. In some embodiments, the SZTP bootstrap server (101) may be provided by a manufacturer of the network device (105). Alternatively, a provider of the SZTP bootstrap server (101) may be different from the manufacturer of the network device (105).

In some embodiments, the SZTP bootstrap server (101) may be operated by an administrator associated with the manufacturer and/or the provider. The administrator may utilize functions and services of the SZTP bootstrap server (101) to remotely bootstrap a network device (105) being installed at a remote site (e.g., a customer defined location or a branch office) to the network. The administrator may also utilize the functions and services of the SZTP bootstrap server (101) to remotely troubleshoot the network device (105).

In some embodiments disclosed herein, the user device (103) may be a physical device (e.g., the computing system of FIG. 4) that includes persistent storage, memory (e.g., random access memory), and one or more processor(s). Examples of the user device (103) include, but are not limited to, a smartphone, a laptop computer, a tablet computer, etc. In one or more embodiments, the user device (103) may belong to a user installing the network device (105) at a site remote from a site hosting the server executing the SZTP bootstrap server (101).

In embodiments disclosed herein, the network device (105) includes a factory-installed SZTP agent. In some embodiments, the user device (103) includes an SZTP application. In some embodiments, the network device (105) is the network device (105) ready to be provisioned. Prior to initial booting, a wireless communication capability of the network device (105) (e.g., Bluetooth®) is enabled (e.g., by an operator of the user device (103)). This wireless communication capability uses a radio frequency to share data over a distance locally.

As illustrated in FIG. 2, which is a flowchart that illustrates an example of a method for provisioning an unprovisioned network device according to some embodiments disclosed herein, upon detecting the wireless communication capability being enabled on the network device (105), the SZTP agent attempts to establish a connection with an SZTP application on the user device (103) which is in close proximity (e.g., within the operational range of Bluetooth® communications) to the network device (105) at provisioning time (201).

Once the connection (i.e., a communication channel) is successfully established, at 203, the SZTP agent on the network device (105) requests SZTP artifacts for provisioning the network device from the SZTP Application on the user device (103). At 205, the SZTP agent receives the SZTP artifacts from the SZTP Application on the user device (103) for provisioning the network device (105).

In some embodiments, the SZTP agent on the network device (105) can determine, at 205, whether the SZTP artifacts from the SZTP Application on the user device (103) contain redirect information to the SZTP bootstrap server (101). If the SZTP artifacts contain redirect information to the SZTP bootstrap server (101), the role played by the user device (103) is complete after transmitting the SZTP artifacts to the SZTP agent on the network device and, at 207, the SZTP agent validates (as per RFC8572, for instance) the redirect information and attempts to connect to the SZTP bootstrap server using the redirect information (101).

Once a connection to the SZTP bootstrap server (101) is established, at 209, the SZTP agent attempts to retrieve additional network device provisioning artifacts from the SZTP bootstrap server (101) and use the network device provisioning artifacts retrieved from the SZTP bootstrap server (101) to provision the network device (105).

At 211, if the SZTP artifacts do not contain redirect information to the SZTP bootstrap server (101), the role played by the user device (103) may or may not be complete after transmitting the SZTP artifacts to the SZTP agent on the network device, depending upon whether the SZTP artifacts from the SZTP Application contain onboarding information sufficient for the SZTP to provision the network device. If so, the SZTP agent may attempt to provision the network device with the onboarding information or through the SZTP Application in which the user device may serve as a relay to a SZTP bootstrap server.

In some embodiments disclosed herein, the network device (105) may be a physical device (e.g., the computing system of FIG. 4) that includes persistent storage, memory (e.g., random access memory), one or more processor(s), and two or more physical ports. Examples of the network device (105) include, but are not limited to, a router, a switch, a top of rack (TOR) switch, and a multilayer switch. In one or more embodiments, the network device (105) may be deployed at a remote site (e.g., a customer defined location or a branch office).

In some embodiments, the persistent storage in the network device (105) may include any type of non-transitory computer readable medium that stores data. For example, the data in the persistent storage may be instructions, which, when executed by one or more processor(s) in the network device (105), enable the network device (105) to perform one or more functions of the network device (105).

In some embodiments, the persistent storage in the user device (103) may include any type of non-transitory computer readable medium that stores data. For example, the data in the persistent storage may be instructions, which, when executed by one or more processor(s) in the user device (103), enable the user device (103) to perform one or more functions of the user device (103).

In some embodiments disclosed herein, communication channels may be established between the user device (103) and the network device (105) and between the network device (105) and the SZTP bootstrap server (101). As illustrated in FIG. 1, the user device (103) and the SZTP bootstrap server (101) do not communicate with one another directly. These communication channels may utilize different types of communication media (e.g., internet connectivity via cellular or Wi-Fi, Bluetooth®, etc.), which allow the user device (103) and the network device (105) to communicate and transfer data (e.g., SZTP artifacts that provide redirection information) between one another. Likewise, various types of communication media can be utilized to allow the network device (105) and the SZTP bootstrap server (101) to communicate and transfer data (e.g., SZTP artifacts that provide onboarding information for the network device to self-provision) between one another.

Figure 3:
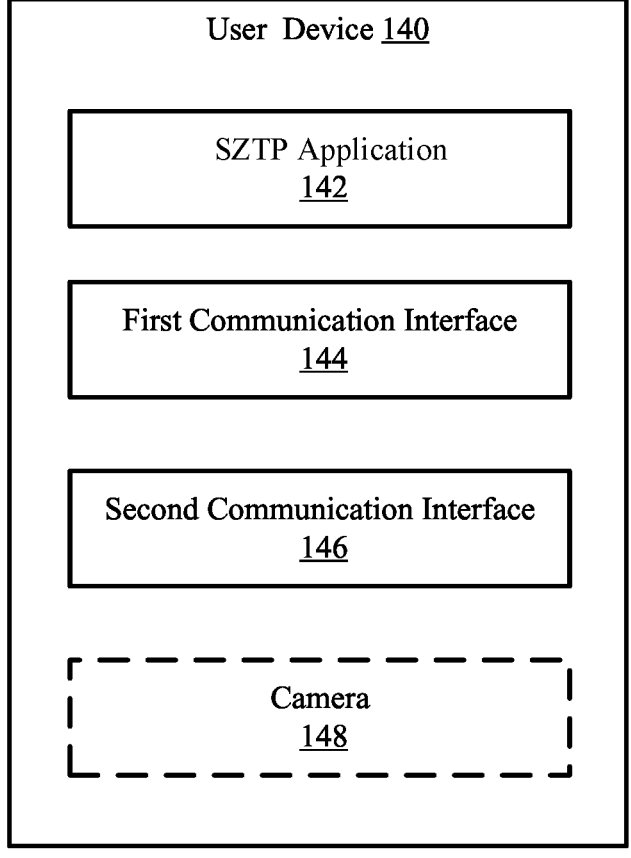
FIG. 3 depicts a diagrammatical representation of a user device according to some embodiments disclosed herein.

Turning now to FIG. 3, which shows a user device (140) in accordance with some embodiments of the disclosure. The user device (140) may be the same as the user device (103) described in FIG. 1. In addition to the components discussed in reference to FIG. 1, the user device (140) can further include: a SZTP application (142), a first communication interface (144), and a second communication interface (146). The user device (140) may also include a camera (148).

In some embodiments disclosed herein, the SZTP application (142) may be a type of application software designed to run on a computing device. For example, the SZTP application (142) may be, but is not limited to, a smartphone application designed to run on a mobile device such as a smartphone, tablet computer, and/or a laptop computer. As a non-limiting example, the SZTP application (142) may be configured as a Bluetooth® SZTP application that communicates with the SZTP agent on the network device (105) as described above.

In some embodiments disclosed herein, the first communication interface (144) and the second communication interface (146) may each be configured in hardware (e.g., circuitry), software, or any combination thereof. For example, the first communication interface (144) and the second communication interface (146) may each be an integrated circuit (IC) (e.g., a computer chip) or a combination of integrated circuits that enable the user device (140) to utilize one or more types of communication media. In particular, the first communication interface (144) may enable the user device (140) to utilize internet connectivity via cellular or Wi-Fi, for instance, to download the Bluetooth® SZTP application. The second communication interface (146) may enable the user device (140) to enable Bluetooth® communications.

One skilled in the art will recognize that the architecture of the system (100) and of the network device (105) is not limited to the components shown in FIGS. 1 and 3. For example, system (100) may include multiple new, unprovisioned network devices (not shown) being installed (and thus need to be provisioned). Further, the user device (140) may include components (e.g., a processor, persistent storage, a display, etc.) not shown in FIG. 3.

Figure 4:
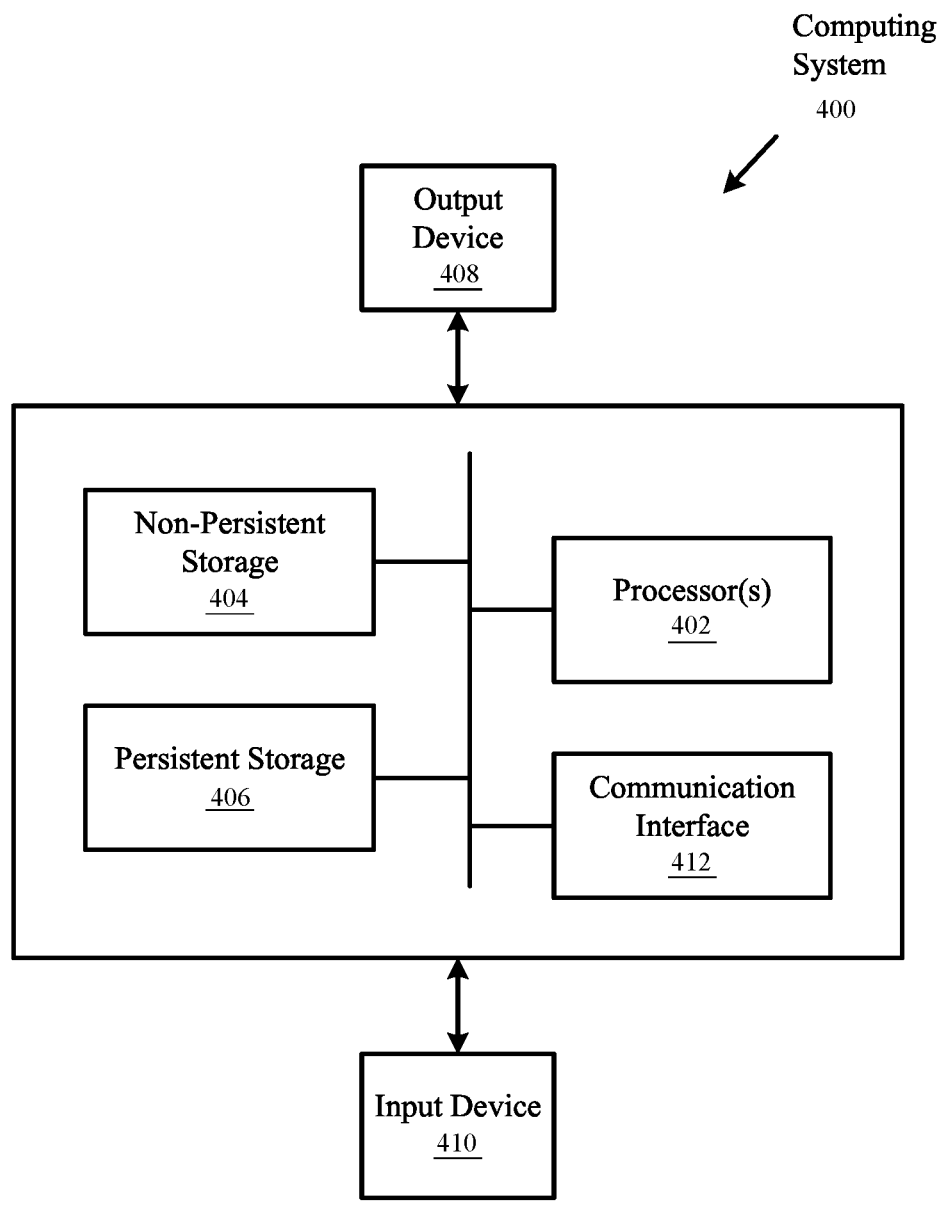
FIG. 4 depicts a diagrammatical representation of a computing device in accordance with some embodiments disclosed herein.

As discussed above, embodiments disclosed herein may be implemented using computing devices. FIG. 4 shows a diagrammatical representation of a computing device in accordance with some embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth® interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing system (400) may also include one or more input devices (410), such as a touchscreen, keyboard, mouse, microphone, touchpad, electronic pen, or any other type of input device. Further, communication interface (412) may include an integrated circuit for connecting computing system (400) to a network (not shown) (e.g., a local area network (LAN), a wide area network (WAN) such as the Internet, mobile network, or any other type of network) and/or to another device, such as another computing device.

In one embodiment disclosed herein, computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for provisioning an unprovisioned network device, the method comprising:

upon detecting a wireless communication capability being enabled on the network device, attempting, by a Secure Zero Touch Provisioning (SZTP) agent on the network device, to establish a wireless connection with an SZTP application on a computing device near the network device;

once the wireless connection is successfully established, requesting, by the SZTP agent on the network device, SZTP artifacts for provisioning the network device from the SZTP application on the computing device;

receiving, by the SZTP agent on the network device over the wireless connection from the SZTP application on the computing device, the SZTP artifacts for provisioning the network device;

determining, by the SZTP agent on the network device, whether the SZTP artifacts received from the SZTP application over the wireless connection contain redirect information;

if the SZTP artifacts contain redirect information to an SZTP bootstrap server on a remote host:

validating, by the SZTP agent, the redirect information; and attempting to connect to the SZTP bootstrap server on the remote host;

once a connection to the SZTP bootstrap server is established, attempting to retrieve additional network device provisioning artifacts from the SZTP bootstrap server on the remote host; and provisioning the network device using the network device provisioning artifacts retrieved from the SZTP bootstrap server on the remote host.

2. The method according to claim 1, further comprising:

determining whether a trusted connection has been established with the SZTP bootstrap server; and if a trusted connection has been established with the SZTP bootstrap server, sending an SZTP progress report to the SZTP bootstrap server over the trusted connection.

3. The method according to claim 2, wherein determining whether the trusted connection has been established with the SZTP bootstrap server comprises determining whether the redirect information is signed.

4. The method according to claim 1, wherein the connection to the SZTP bootstrap server is an untrusted connection, the method further comprising:

responsive to the untrusted connection to the SZTP bootstrap server being established, promoting the untrusted connection to a trusted connection.

5. The method according to claim 1, wherein the validating the redirect information comprises verifying a voucher signed by a manufacturer of the network device using the manufacturer's public key included on the network device.

6. The method according to claim 1, wherein the SZTP artifacts comprise configuration information for setting up the network device on a computer network, the configuration information comprises at least one of:

a network address,
a routing policy,
credential information, or
domain name server information.

7. The method according to claim 1, wherein attempting to connect to the SZTP bootstrap server comprises making a remote procedure call to the SZTP bootstrap server.

8. A self-provisioning network device in a factory-default state, the network device comprising:

a wireless communication capability that uses a radio frequency to share data over a distance locally, and a factory-installed Secure Zero Touch Provisioning (SZTP) agent that is configured for:

upon detecting the wireless communication capability being enabled on the network device, attempting to establish a wireless connection with an SZTP application on a computing device near the network device;

once the wireless connection is successfully established, requesting SZTP artifacts for provisioning the network device from the SZTP application on the computing device;

receiving, over the wireless connection from the SZTP application on the computing device, the SZTP artifacts for provisioning the network device;

determining whether the SZTP artifacts received from the SZTP application over the wireless connection contain redirect information;

if the SZTP artifacts contain redirect information to an SZTP bootstrap server on a remote host:

validating the redirect information; and attempting to connect to the SZTP bootstrap server on the remote host;

once a connection to the SZTP bootstrap server is established, attempting to retrieve additional network device provisioning artifacts from the SZTP bootstrap server on the remote host; and provisioning the network device using the network device provisioning artifacts retrieved from the SZTP bootstrap server on the remote host.

9. The network device of claim 8, wherein the SZTP agent is further configured for:

determining whether a trusted connection has been established with the SZTP bootstrap server; and if a trusted connection has been established with the SZTP bootstrap server, sending an SZTP progress report to the SZTP bootstrap server over the trusted connection.

10. The network device of claim 9, wherein the SZTP agent is further configured for:

determining whether the trusted connection has been established with the SZTP bootstrap server comprises determining whether the redirect information is signed.

11. The network device of claim 8, wherein the connection to the SZTP bootstrap server is an untrusted connection and wherein the SZTP agent is further configured for:

responsive to the untrusted connection to the SZTP bootstrap server being established, promoting the untrusted connection to a trusted connection.

12. The network device of claim 8, wherein the validating the redirect information comprises verifying a voucher signed by a manufacturer of the network device using the manufacturer's public key included on the network device.

13. The network device of claim 8, wherein the SZTP artifacts comprise configuration information for setting up the network device on a computer network, the configuration information comprises at least one of:

a network address,
a routing policy,
credential information, or
domain name server information.

14. The network device of claim 8, wherein attempting to connect to the SZTP bootstrap server comprises making a remote procedure call to the SZTP bootstrap server.

15. A computer program product for self-provisioning a network device, the computer program product comprising a non-transitory computer-readable medium storing instructions translatable by a processor of a network device for implementing a Secure Zero Touch Provisioning (SZTP) agent, the network device having a wireless communication capability that uses a radio frequency to share data over a distance locally, the SZTP agent configured for:

upon detecting the wireless communication capability being enabled on the network device, attempting to establish a wireless connection with an SZTP application on a computing device near the network device;

once the wireless connection is successfully established, requesting SZTP artifacts for provisioning the network device from the SZTP application on the computing device;

receiving, over the wireless connection from the SZTP application on the computing device, the SZTP artifacts for provisioning the network device;

determining whether the SZTP artifacts received from the SZTP application over the wireless connection contain redirect information;

if the SZTP artifacts contain redirect information to an SZTP bootstrap server on a remote host:

validating the redirect information; and attempting to connect to the SZTP bootstrap server on the remote host;

once a connection to the SZTP bootstrap server is established, attempting to retrieve additional network device provisioning artifacts from the SZTP bootstrap server on the remote host; and provisioning the network device using the network device provisioning artifacts retrieved from the SZTP bootstrap server on the remote host.

16. The computer program product of claim 15, wherein the SZTP agent is further configured for:

determining whether a trusted connection has been established with the SZTP bootstrap server; and if a trusted connection has been established with the SZTP bootstrap server, sending an SZTP progress report to the SZTP bootstrap server over the trusted connection.

17. The computer program product of claim 16, wherein the SZTP agent is further configured for:

determining whether the trusted connection has been established with the SZTP bootstrap server comprises determining whether the redirect information is signed.

18. The computer program product of claim 15, wherein the connection to the SZTP bootstrap server is an untrusted connection and wherein the SZTP agent is further configured for:

responsive to the untrusted connection to the SZTP bootstrap server being established, promoting the untrusted connection to a trusted connection.

19. The computer program product of claim 15, wherein the validating the redirect information comprises verifying a voucher signed by a manufacturer of the network device using the manufacturer's public key included on the network device.

20. The computer program product of claim 15, wherein attempting to connect to the SZTP bootstrap server comprises making a remote procedure call to the SZTP bootstrap server.

* * * * *